United States Patent [19]
Patzelt

[11] 3,938,824
[45] Feb. 17, 1976

[54] PROTECTIVE INSTALLATION, ESPECIALLY FOR THE PASSENGERS OF MOTOR VEHICLES

[75] Inventor: Helmut Patzelt, Fellbach, Germany

[73] Assignee: Daimler-Benz Aktiengesellschaft, Germany

[22] Filed: Nov. 15, 1973

[21] Appl. No.: 416,055

[30] Foreign Application Priority Data
Nov. 18, 1972  Germany............................ 2256720

[52] U.S. Cl............................ 280/150 AB; 5/348 R
[51] Int. Cl.²......................................... B60R 21/08
[58] Field of Search .............. 280/150 AB; 5/348 R

[56] References Cited
UNITED STATES PATENTS

| | | | |
|---|---|---|---|
| 3,617,073 | 11/1971 | Landsman | 280/150 AB |
| 3,727,942 | 4/1973 | Arntson | 280/150 AB |

FOREIGN PATENTS OR APPLICATIONS

| | | | |
|---|---|---|---|
| 2,152,902 | 4/1973 | Germany | 280/150 AB |

*Primary Examiner*—Leo Friaglia
*Assistant Examiner*—John P. Silverstrim
*Attorney, Agent, or Firm*—Craig & Antonelli

[57] ABSTRACT

A protective installation, especially for the passengers of motor vehicles, which is equipped with an air bag automatically inflatable by means of a gas when exceeding a predetermined vehicle deceleration; an insert which, in relation to the main flow direction of the gas, is disposed at a distance to the bag bottom during the inflation and which extends transversely to the main flow direction of the gas is thereby coordinated to the air bag; the insert forms in its area disposed in the main gas flow a baffle surface for the inflowing gas; the air bag is thereby securely connected with the insert within the area of its bottom facing the passenger while the insert is also anchored at a relatively fixed vehicle part by elastic retaining means.

7 Claims, 1 Drawing Figure

U.S. Patent  Feb. 17, 1976  3,938,824
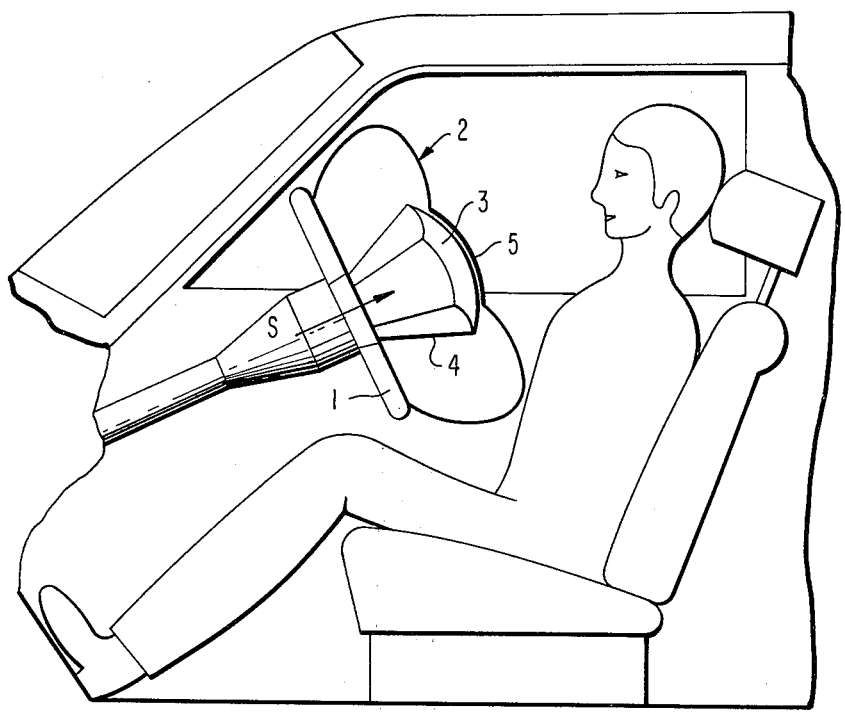

PROTECTIVE INSTALLATION, ESPECIALLY FOR THE PASSENGERS OF MOTOR VEHICLES

The present invention relates to a protective installation, especially for the passengers of motor vehicles, with an air bag which is automatically inflatable by means of a gas upon exceeding a predetermined vehicle deceleration, whereby an insert extending transversely to the main flow direction of the gas and in relation to the main flow direction of the gas, disposed at a distance to the bag bottom, is coordinated to the air bag during the inflation, which insert forms in its area disposed in the gas main flow an impact or baffle surface for the inflowing gas whereby the air bag within the area of its bottom facing the passenger is securely connected with the insert, as disclosed in German Patent Application P 21 52 902.2, and corresponding U.S. Pat. No. 3,874,693 the subject matter of which is incorporated herein by reference to the extent necessary.

It was to be avoided by such a construction of the air bag that the air bag is inflated by the inflowing gas at the beginning of the inflation operation essentially only in one direction, and more particularly toward the person to be protected, and expands at first in the flow direction of the gas with a relatively small diameter and with a corresponding high velocity lying near the supersonic range.

A forcible radial expansion of the air bag is instead attained by means of such a type of construction, whereby the height of the thus-formed "air bag disk" is determined essentially by the length of the retaining means of the insert.

However, tests with such air bags have demonstrated that the fastening places of the retaining means at the insert and/or at the bottom of the air bag are stressed very highly during the sudden impact-like deceleration thereof so that in particularly unfavorable cases a destruction of these fastening places may occur.

A further considerable disadvantage of this sudden deceleration of the air bag resides in that a very high additional sound pressure is produced by this braking action which may lead to an increased danger, for example, of the ear drums of the vehicle passengers.

The present invention is therefore concerned with the task to avoid these disadvantages and to provide an air bag, in which a destruction of the connection of the retaining means with the insert and with the air bag bottom is precluded and which additionally does not effect any further increase of the already considerable sound pressure in the interior space of a vehicle during the unfolding of an air bag.

The underlying problems are solved according to the present invention in that the insert is anchored at a relatively fixed part of the vehicle by elastic retaining means.

These elastic retaining means may be made, for example, out of the air bag material by cutting at a predetermined angle to the warp or weft direction of the fabric.

Accordingly, it is an object of the present invention to provide a protective installation, especially for the passengers of motor vehicles, which avoids by simple means the aforementioned shortcomings and drawbacks encountered in the prior art.

Another object of the present invention resides in a protective installation, especially for the passengers of motor vehicles, in which a damage to the connection of the retaining means with the insert or the air bag bottom is effectively precluded.

A further object of the present invention resides in a protective installation, especially for the passengers of motor vehicles, which minimizes an increase in the danger to the ear drums of the passengers due to the further development of high pressure sound waves, especially supersonic sound waves.

Still another object of the present invention resides in a protective installation for the passengers of motor vehicles of the type described above which is simple in construction, yet is highly reliable in operation.

These and other objects, features, and advantages of the present invention will become more apparent from the following description when taken in connection with the accompanying drawing which shows, for purposes of illustration only, one embodiment in accordance with the present invention, and wherein:

The single FIGURE is a schematic partial side elevational view of a passenger motor vehicle cut open in the area of the passenger space and equipped with a protective installation for the driver in accordance with the present invention.

Referring now to the single FIGURE of the drawing, an air bag generally designated by reference numeral 2 is secured in a conventional manner not illustrated in detail herein at the steering wheel 1 of the passenger motor vehicle schematically illustrated in a cut-away view; the air bag 2 is thereby illustrated in the single FIGURE of the drawing in the inflated or filled condition. An insert 3 which is disposed in the main flow direction S of the gas serving for the filling of the air bag 2, is arranged on the inside of the air bag 2. The insert 3 is anchored also within the area of the steering wheel 1 by way of elastic retaining means which are constructed in the illustrated embodiment as side or flank 4. The bottom 5 of the air bag 2 facing the vehicle passenger is thereby securely connected with the insert 3, for example, by bonding, gluing or sewing.

As mentioned hereinabove, the elastic retaining means may be realized in any conventional manner, for example, by cutting the fabric material of the air bag at a predetermined angle to the warp or weft direction of the fabric. This is so as the air bags normally consist of a fabric material which already has a considerable elasticity in certain directions—depending on the weft and warp direction, i.e., from the pattern of the threads. If this fabric is now cut into strips in such a manner that by reason of the pattern of the threads a certain elasticity in the longitudinal direction of the strips exist, then these strips may be used as elastic retaining means within the meaning of the present invention.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. In a protective installation, especially for the passengers of motor vehicles, which includes an air bag means automatically inflatable by means of a gas upon exceeding a predetermined vehicle deceleration, and an insert means coordinated to the air bag means which during the inflation is disposed at a distance to the bag bottom, in relation to the main flow direction of the gas and extends essentially transversely to the main flow direction of the gas, said insert means forming in the area thereof disposed in the main flow of the gas a baffle surface for the inflowing gas, and the air bag means being securely connected with the insert means within the area of its bottom facing the passenger, the improvement comprising elastic retaining means for anchoring said insert means at a relatively fixed vehicle part, said elastic retaining means including strips of the fabric material of said air bag means.

2. An installation according to claim 1, wherein the elasticity of said elastic retaining means minimize stress on said fixed vehicle part during expansion of said air bag means.

3. An installation according to claim 1, wherein the elastic retaining means are flanks connecting the insert means with the fixed vehicle part.

4. An installation according to claim 1, wherein the relatively fixed vehicle part forms part of the steering wheel assembly.

5. An installation according to claim 4, wherein said insert means is securely connected to said air bag means by means of at least one of a bond, a glue or a sewn connection.

6. An installation according to claim 1, wherein said strips of fabric material of said air bag means have a predetermined angle to at least one of the warp or weft direction of said fabric material such as to impart elasticity to said strips.

7. An installation according to claim 1, wherein said elastic retaining means hold said insert means at approximately a predetermined distance from said relatively fixed vehicle part determined substantially by the length of said elastic retaining means.

\* \* \* \* \*